United States Patent [19]
Yuasa et al.

[11] Patent Number: 5,110,623
[45] Date of Patent: May 5, 1992

[54] METHOD OF ORIENTING A LIQUID CRYSTAL MATERIAL, APPARATUS THEREFOR, AND LIQUID CRYSTAL DEVICE ORIENTED THEREBY

[75] Inventors: Kimihiro Yuasa; Kenji Hashimoto, both of Chiba, Japan

[73] Assignee: Idemitsu Kosan Co., Ltd., Tokyo, Japan

[21] Appl. No.: 531,170

[22] Filed: May 31, 1990

[30] Foreign Application Priority Data

Jun. 2, 1989 [JP] Japan .................................. 1-139134
Jul. 10, 1989 [JP] Japan .................................. 1-175662
Nov. 22, 1989 [JP] Japan .................................. 1-302196

[51] Int. Cl.⁵ .............................................. B05D 5/06
[52] U.S. Cl. ........................................ 427/162; 156/229; 156/324; 428/1; 359/76; 359/54
[58] Field of Search ............... 156/229, 324; 427/162; 428/1; 350/334, 340, 341, 350 S

[56] References Cited

U.S. PATENT DOCUMENTS 4,904,065  2/1990  Yuasa et al. ................. 427/171 X
4,973,373 11/1990  Hasamoto et al. ............... 156/229

Primary Examiner—Michael Lusignan
Attorney, Agent, or Firm—Antonelli, Terry, Stout & Kraus

[57] ABSTRACT

A uniform orientation can be brought about to the liquid crystal material enclosed in a liquid crystal device by applying a shearing force to the liquid crystal material while an electric field is being applied to the liquid crystal material, without requiring disposition of orientation layers nor accurate control of temperature. The orientation method can be efficiently conducted by an apparatus comprising a supply roll for supplying and conveying the liquid crystal device, a roller having conductive orientation rolls for bending the conveyed liquid crystal device and for applying an electric field to the liquid crystal material, a power source for applying a voltage to the conductive orientation roll, and a receiving means for receiving the liquid crystal device which has gone through the bending.

14 Claims, 5 Drawing Sheets

Fig. 6
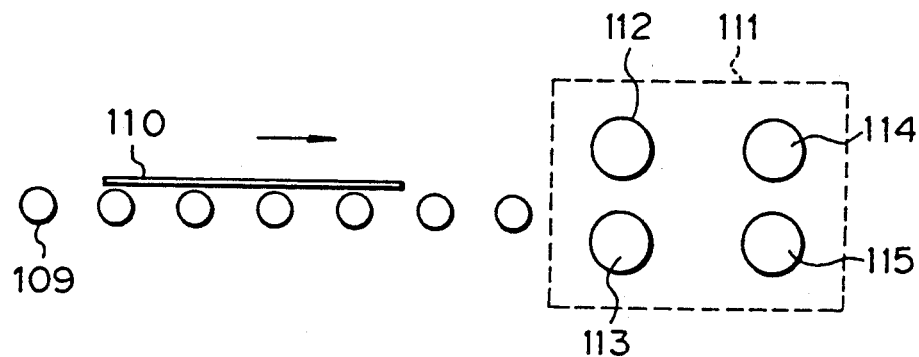
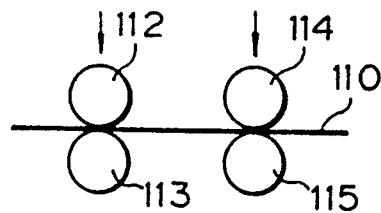
Fig. 7(a)
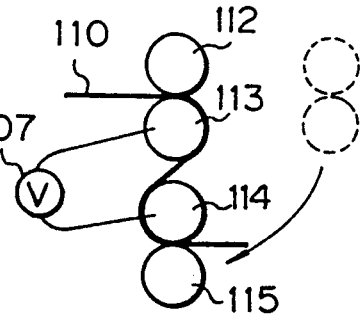
Fig. 7(b)
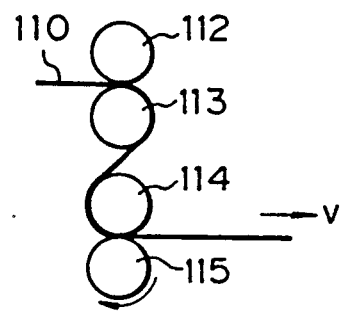
Fig. 7(c)

METHOD OF ORIENTING A LIQUID CRYSTAL MATERIAL, APPARATUS THEREFOR, AND LIQUID CRYSTAL DEVICE ORIENTED THEREBY

BACKGROUND OF THE INVENTION (a) Field of the Invention

The present invention relates to a method of orienting liquid crystal materials which are used for the preparation of liquid crystal devices such as liquid crystal optical devices, liquid crystal memory devices, and liquid crystal acoustic devices, to apparatuses to be used for the method, and to a liquid crystal device the liquid crystal material of which is oriented by the method.

(b) Description of the Related Art

One of the known techniques for orienting liquid crystal materials is to use electric field. For instance, (1) R. Simons, et al (Polymer, 27, 811 (1986) discloses a method in which homeotropic orientation is brought about into a liquid-crystalline polymer by disposing the liquid-crystalline polymer between two electrodes and applying an alternating electric field of 60 V, 2 kHz thereto at 150° C. for a long period, (2) in Japanese Patent Application Kokai Koho (Laid-open) No. 63-144324, disclosed is a method in which an insulating layer is provided on at least one of the electrodes supporting a liquid-crystalline polymer (main-chain type or side-chain type) to prevent dielectric breakdown of the liquid-crystalline polymer, thereby enabling application of an electric field sufficient for orienting the liquid-crystalline polymer, (3) in Japanese Patent Application Kokai Koho (Laid-open) No. 63-121815 and Japanese Patent Application Kokai Koho (Laid-open) No. 63-151927, disclosed are methods in which a ferroelectric liquid crystal is cooled slowly after heated until it exhibits isotropic phase, and during the slow cooling, the ferroelectric liquid crystal is oriented by applying an electric field, and (4) in Japanese Patent Application Kokai Kohl (Laid-open) No. 63-243165, disclosed is a method in which a mixture of side-chain liquid-crystalline polymers and low molecular weight liquid crystals is oriented by applying a direct-current voltage.

The method (1) however is poor in productivity because it needs processes for high-temperature heating and for long application of alternative-current voltage. Further, when the method is used for orienting ferroelectric liquid crystals, uniaxially homogeneous orientation, which is essential for ferroelectric liquid crystal devices, cannot be brought about. The reason is that, in cases where the anisotropy of dielectric constant $\Delta\epsilon$ of the liquid crystal molecules is positive, homeotropic orientation is brought about, and in cases where $\Delta\epsilon$ is negative, although homogeneous orientation can be brought about, the direction of the orientation are randomly varied on the plane parallel to the surfaces of substrates. The method (2) also is to bring about homeotropic orientation into liquid crystals having smectic A phase or nematic phases. Therefore, although the method also can align the liquid crystal molecules parallel to substrates if the liquid crystals have negative anisotropy of dielectric constants $\Delta\epsilon$, the direction of the alignment is randomly varied on the plane parallel to the surfaces of substrates, and uniaxially homogeneous orientation cannot be produced. These methods, therefore, have a difficulty that uniaxially homogeneous orientation cannot be brought about into ferroelectric liquid crystals, whether they are low molecular weight liquid crystals or liquid-crystalline polymers. The method (3) needs interfacial treatment, for instance previous coating of substrates with polymers followed by rubbing treatment or previous SiO oblique evaporation, for producing uniaxial orientation, and the electric field applied merely plays an auxiliary role to reduce the infection of the interfacial treatment on the resulting oriented state. Therefore, the process of the method (3) is as complicated as that of conventional orientation methods using rubbing treatment or SiO oblique evaporation, and slow cooling from isotropic phase is essential for the method, resulting in poor productivity. The method (4) needs a specific mixing ratio between side-chain liquid-crystalline polymers and low molecular weight liquid crystals to keep the liquid crystal mixtures in one liquid crystal state at temperatures lower than the liquid crystal phase-isotropic phase transition temperature without causing phase separation and to prevent the change of orientation state at room temperature. The method (4) therefore has a difficulty that it is not always applicable for every liquid crystal mixture.

There are also known methods which use shearing force for orienting liquid crystal materials. An example of such methods is to apply a shearing force to a ferroelectric liquid crystal supported between two substrates by slightly sliding the substrates each other, thereby bringing about homogeneous orientation into the ferroelectric liquid crystal (N. A. Clark. et al.: Appl. Phys. Lett., 36, 899 (1980)). However, the method has a difficulty in producing an oriented state over a large area, and has a problem that accurate adjustment of temperature is required during application of shearing.

With regard to dot matrix liquid crystal devices, there have been proposed various methods for improving their visibility. For example, in addition to conventional black stripe system well known in the art, there have been proposed a liquid crystal display device and a method of producing it in which its orientation film, exclusive of the parts corresponding to the parts of display pattern, is covered with a masking layer, so that its orienting function is taken away from the parts covered with the masking layer, thereby orienting only the parts of liquid crystal corresponding to the parts of display pattern where the orientation film is not covered with the masking layer (Japanese Patent Application Kokai Koho (Laid-open) No. 63-101826). However, the method needs the step of printing the masking layer in order to give orienting function selectively to the parts of display pattern, and, considering the fact that liquid crystal display devices become highly elaborate and highly close increasingly, with the gap separating the display parts from each other narrowed exceedingly, a highly accurate technique is required for printing the masking layer. Providing the orientation film and masking layer itself reduces productivity. Further, the method requires rubbing treatment for orienting the orientation film and, in addition, slow cooling of the liquid crystal device from the temperature at which the liquid crystal exhibits isotropic phase to room temperature whereby the productivity is decreased more and more.

SUMMARY OF THE INVENTION

An object of the present invention is to provide a method of orienting liquid crystal materials which can bring about uniform orientation over a large area in a very short time, without requiring any pretreatment on substrates, such as disposition of orientation layers, nor accurate control of temperature.

Another object of the present invention is to provide an apparatus which can be used advantageously for practicing efficiently the method of orienting liquid crystal materials.

More another object of the present invention is to provide a liquid crystal device enclosing a liquid crystal material oriented by the above-described method.

The inventor's diligent study for dissolving the above-described problems led them to a finding that the problems can be dissolved by applying a shearing force to a liquid crystal material while an electric field is being applied to the liquid crystal material, and on basis of the finding, they completed the present invention.

That is, the present invention provides a method of orienting a liquid crystal material, comprising; orienting the liquid crystal material by applying a shearing force to the liquid crystal material while an electric field is being applied to the liquid crystal material.

The method of the present invention makes it possible to bring about uniform orientation over a large area in a very short time, without requiring any pretreatment on substrates nor accurate control of temperature. In addition, in cases where flexible substrate are used, flexible panels exhibiting high contrast can be produced by using ferroelectric liquid crystal materials, production of such panels having been thought to be impossible.

The present invention further provides an apparatus for orienting a liquid crystal material enclosed in a liquid crystal device in which the liquid crystal material is supported between two flexible substrates bearing on their surfaces facing each other their respective electrode structures, comprising;

(a) a conveyance means for conveying the liquid crystal device;

(b) a roller having at least two conductive orientation rolls for bending the conveyed liquid crystal device by bringing the liquid crystal device into contact with the surfaces of the two conductive orientation rolls;

(c) a means for applying a voltage between the two conductive orientation rolls while the liquid crystal device is being bent; and (d) a receiving means for receiving the liquid crystal device which has gone through the bending.

The present invention further provides an apparatus for orienting a liquid crystal material enclosed in a liquid crystal device in which the liquid crystal material is supported between two flexible substrates bearing on their surfaces facing each other their respective electrode structures, comprising;

(a) a conveyance means for conveying the liquid crystal device;

(b) a roller having at least one orientation roll for bending the conveyed liquid crystal device by bringing the liquid crystal device into contact with the surface of the orientation roll, the orientation roll having on its surface a plurality of conductive parts insulated from each other;

(c) a means for applying a voltage to each of the conductive parts of the orientation roll while the liquid crystal device is being bent; and (d) a receiving means for receiving the liquid crystal device which has gone through the bending.

The method of the present invention can be effectively practiced by using these apparatuses.

Further, the present invention provides a dot matrix liquid crystal device, comprising;

a liquid crystal material and two flexible substances having on their surfaces facing each other their respective electrode structures and supporting the liquid crystal material between them, the liquid crystal material enclosed in the liquid crystal device being a ferroelectric liquid crystal material having a ferroelectric smectic phase and having been oriented by the method of the present invention to bring about uniaxially homogeneous orientation into the separate picture element parts of the liquid crystal material, each of the two electrode structures of the flexible substrates being a striped electrode structure consisting of more than one electrode stripes arranged in parallel, and the two electrode structures being so arranged that the two directions of the electrode stripes of the electrode structures approximately make right angle, thereby making in the ferroelectric liquid crystal material a plurality of separate picture element parts which are disposed between the electrode structures facing each other.

The dot matrix liquid crystal device which has been oriented using the method of the present invention has a good visibility of dot display and a wide angle of visibility and can exhibit high contrast. Further, thin dot matrix liquid crystal device can also be produced by using the method of the present invention.

BRIEF DESCRIPTION OF THE DRAWINGS

FIG. 6 is a view illustrating the apparatus of another embodiment according to the present invention. Provided that the receiving means for receiving the cut-sheet of liquid crystal material which has gone through bending is not shown.

FIG.7(a), FIG. 7(b), and FIG. 7(c) are schematic views illustrating the movement of the rolls of the apparatus shown in FIG. 6.

DESCRIPTION OF THE PREFERRED EMBODIMENTS

Figure 1:
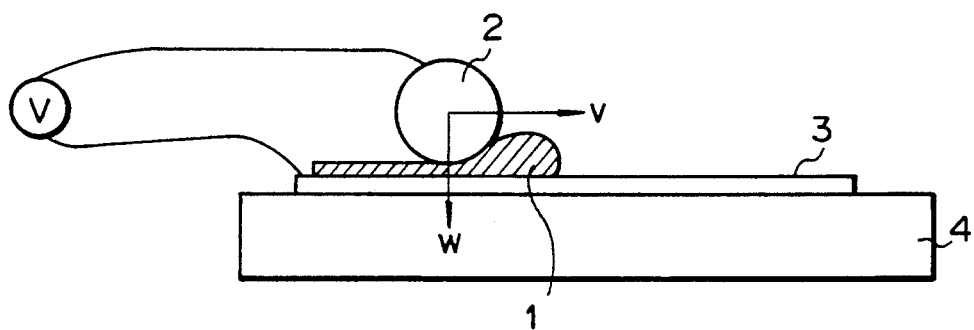
FIG. 1 is a sectional view illustrating the method of an embodiment according to the present invention wherein a liquid crystal material is being oriented by coating a substrate bearing an electrode structure with the liquid crystal material using a bar coater having a conductive bar, thereby applying a shearing force to the liquid crystal material while an electric field is being applied to the liquid crystal material.

The liquid crystal material to be oriented by the method of the present invention may have any shape so far as the shape does not hinder applications of electric field and shearing force. If the liquid crystal material is formed into film, every conventional method for film forming may be used. It is preferable to support the liquid crystal material formed into film between two substrates having their respective electrode structures in order to facilitate the applications of an electric field and a shearing force. It is further preferable to use flexible substrates so that a shearing force can be easily and effectively applied even to a liquid crystal material having a large area.

Examples of the method for supporting the liquid crystal material between two substrates include a method in which after two substrates are assembled in parallel to each other with spacers interposed between them, a liquid crystal material is poured into the vacant space between the substrates using capillary phenomenon or vacuum injection technique, a method in which a liquid crystal material is placed on one substrate, and then, the other substrate is pressed to the substrate with the liquid crystal material sandwiched between them, and a method in which after one substrate is coated with a film of a liquid crystal material, the other substrate is laminated on the film of liquid crystal material. It is particularly preferable to use flexible substrates bearing their respective electrode structures whereby the step for applying liquid crystal materials, the step for lamination, and so on can be conducted continuously and in a high speed.

The preferred liquid crystal materials to be used in the present invention are those which exhibit a liquid crystal phase selected from nematic phases, cholesteric phases, and various smectic phases at the temperature at which the liquid crystal devices containing the liquid crystal materials is used in practice. The particularly preferred are smectic liquid crystal materials which exhibit a ferroelectric phase such as chiral smectic C phase. Some examples of the smectic liquid crystal materials include low molecular weight ferroelectric liquid crystals; high molecular ferroelectric liquid crystals; compositions consisting of two or more of them; and compositions in which low molecular weight or high molecular non-liquid-crystalline compounds having no ferroelectricity or low molecular weight or high molecular liquid-crystalline compounds having no ferroelectricity are so combined with low molecular weight or high molecualr non-liquid-crystalline compounds having chirality or low molecular weight or high molecular liquid-crystalline compounds having chirality that the compositions exhibit a ferroelectric liquid crystal phase such as chiral smectic C phase. Amoung these, the most preferred are those having chiral smectic C phase.

Some examples of ferroelectric liquid-crystalline polymers include liquid-crystalline polymers having polyacrylate main chain, liquid-crystalline polymers having polymethacrylate main chain, liquid-crystalline polymers having polychloroacrylate main chain, liquid-crystalline polymers having polyoxirane main chain, liquid-crystalline polymers having polysiloxane main chain, and liquid-crystalline polymers having polyester main chain.

Some examples of the liquid-crystalline polymers having polyacrylate main chain include those having the following structures;

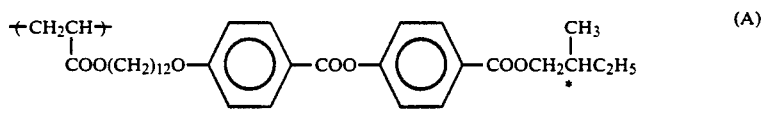

(A)

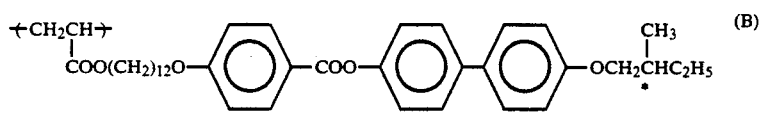

(B)

Some examples of the liquid-crystalline polymers having polymethacrylate main chain include those having the following structures;

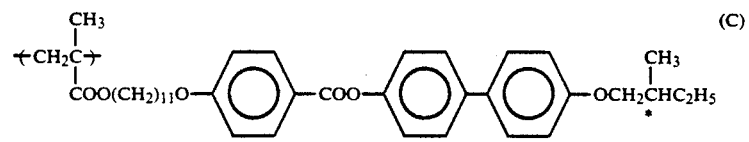

(C)

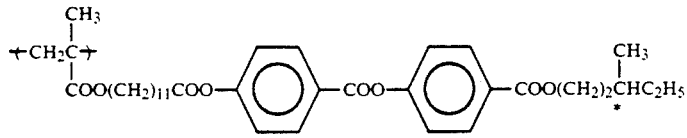
(D)

Some examples of the liquid-crystalline polymers having polychloroacrylate main chain include those having the following structures;

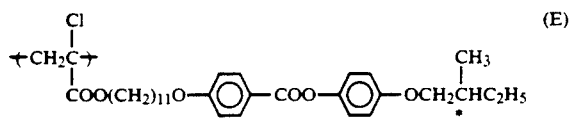
(E)

An example of the liquid-crystalline polymers having polyoxirane main chain has the following structure;

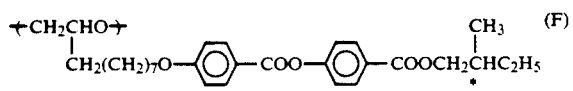
(F)

An example of the liquid-crystalline polymers having polysiloxane main chain has the following structure;

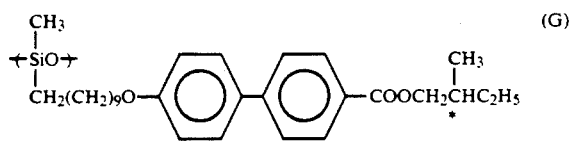
(G)

Some examples of the liquid-crystalline polymers having polyester main chain include those having the following structures;

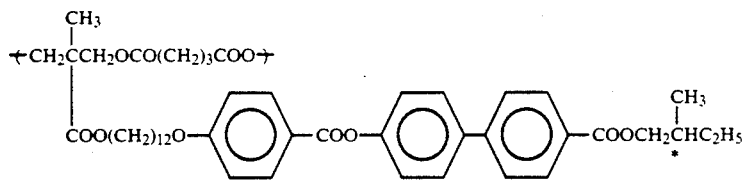
(H)

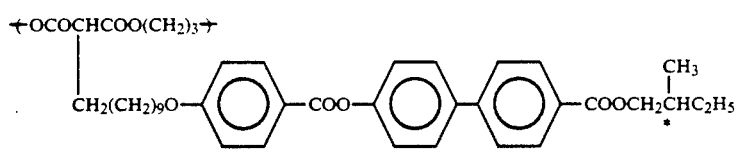
(I)

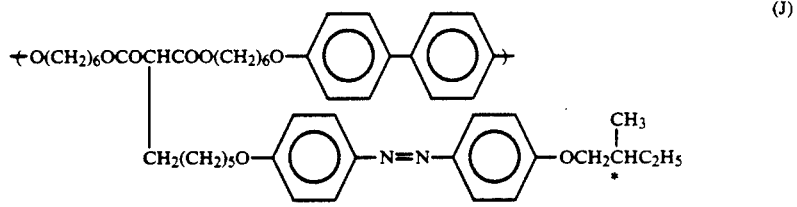
(J)

In the repeating units described above, the mesogenic portion in the side chain of each of the above-described ferroelectric liquid-crystalline polymer may be replaced by biphenyl skeleton, phenyl benzoate skeleton, biphenyl benzoate skeleton, or phenyl 4-phenylbenzoate skeleton. Further, each benzene ring in each of the skeletons may be replaced by pyrimidine ring, pyridine ring, pyridazine ring, pyrazine ring, tetrazine ring, cyclohexane ring, dioxane ring or dioxoborinane ring, and may have substituents including halogens, such as fluorine and chlorine, and cyano group. The optically active end groups also may be replaced by other various optically active groups including 1-methylalkyl groups, 2-fluoroalkyl groups, 2-chloroalkyl groups, 2-chloro-3-methylalkyl groups, 2-(trifluoromethyl)alkyl groups, 1-alkoxycarbonylethyl groups, 2-chloro-1-methylalkyl groups, and 2-alkoxycarbonyl-1-(trifluoromethyl)propyl groups, or by these other optically active groups through an ester bond or an ether bond. The length of spacer (length of methylene chain) may also be varied within a range of from 1 to 30.

The number average molecular weight of the above-described ferroelectric liquid-crystalline polymers which may be used in the present invention is 1,000 to 200,000.

Some examples of ferroelectric low molecular weight liquid crystals which may be used include Schiff base ferroelecric low molecular weight liquid-crystalline compounds, azo and azoxy ferroelectric low molecular weight liquid-crystalline compounds, biphenyl and aromatics ester ferroelectric low molecular weight liquid-crystalline compounds, ferroelectric low molecular weight liquid-crystalline compounds having substituents such as halogens or cyano group on their rings, and ferroelectric low molecular weight liquid-crystalline compounds having heterocycles.

Some examples of Schiff base ferroelectric low molecular weight liquid-crystalline compounds include the following compounds (1) to (4).

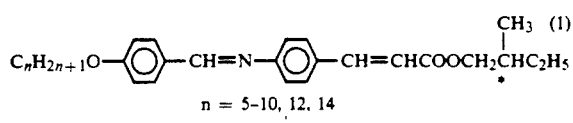
(1)

$n = 5-10, 12, 14$

-continued

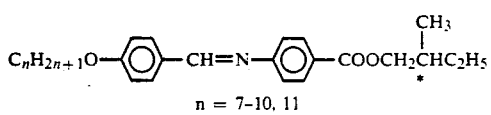
n = 7-10, 11

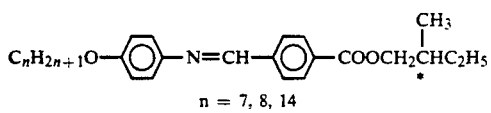
n = 7, 8, 14

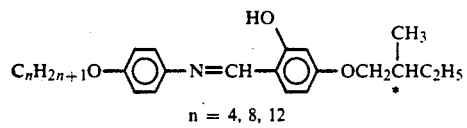
n = 4, 8, 12

Some examples of azo and azoxy ferroelectric low molecular weight liquid-crystalline compounds include the following compounds (5) and (6).

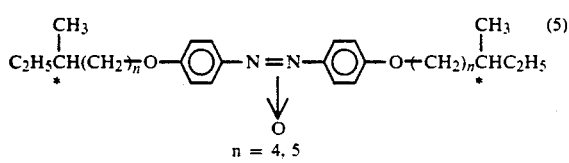
n = 4, 5

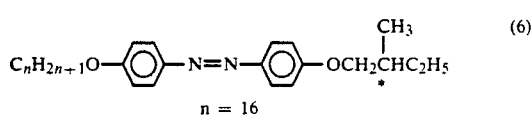
n = 16

Some examples of biphenyl and aromatics ester ferroelectric low molecular weight liquid-crystalline compounds include the following compounds (7) and (8).

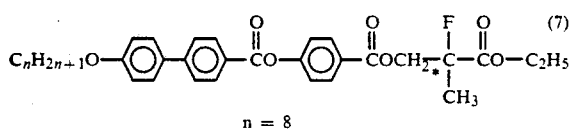
n = 8

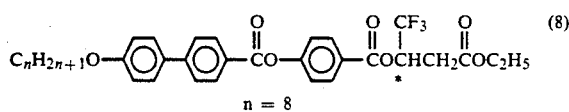
n = 8

Some examples of ferroelectric low molecular weight liquid-crystalline compounds having substituents such as halogens or cyano group on their rings include the following compounds (9) to (11).

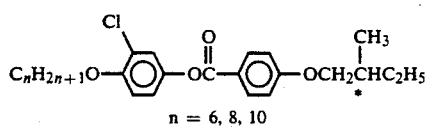
n = 6, 8, 10

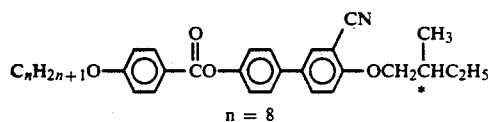
n = 8

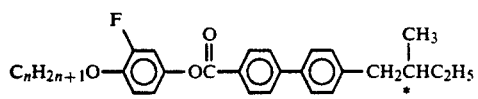
n = 4, 6

Some examples of ferroelectric low molecular weight liquid-crystalline compounds having heterocycles include the following compounds (12) and (13).

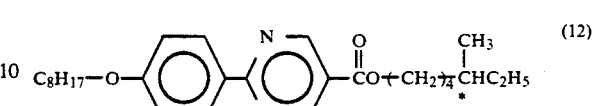

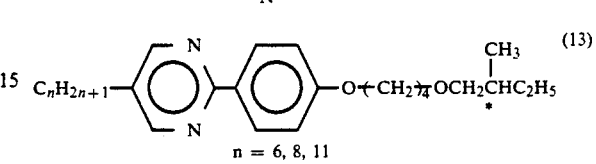
n = 6, 8, 11

The above-described compounds are typical examples of ferroelectric low molecular weight liquid-crystalline compounds, and the ferroelectric low molecular weight liquid-crystalline compounds which may be used in the present invention are not limited to these compounds.

Non-liquid-crystalline polymers may be added into the above-described liquid crystal materials in an amount of from 2 to 60% by weight of the total of the liquid crystal materials and the non-liquid-crystalline polymers in order to improve the mechanical strength of liquid crystal panels and to make the liquid crystal material easy to orient using bending orientation technique. The poylmers which may be added include thermoplastic resins and crosslinkable resins. Among these non-liquid crystalline polymers, the particularly preferred are those commonly used as adhesive.

The preferred thermoplastic resins have a glass transition point (Tg) of not lower than 30° C., more preferably not lower than 70° C.

Some illustrative examples of such thermoplastic resins include polymers or copolymers of vinyl halides, including polyvinylchloride, polyvinylbromide, polyvinylfluoride, vinyl chloride-vinyl acetate copolymer, vinyl chloride-ethylene copolymer, vinyl chloride-propylene copolymer, vinyl chloride-vinylidene chloride copolymer, vinyl chloride-butadiene copolymer, vinyl chloride-acrylic ester copolymers, vinyl chloride-acrylonitrile copolymer, vinyl chloride-styrene-acrylonitrile terpolymer, vinyl chloride-vinylidene chloride-vinyl acetate terpolymer, polyvinylidenechloride, polytetrafluoroethylene, polytrifluorochloroethylene, and polyvinylidene fluoride;

polymers or copolymers of unsaturated alcohols or unsaturated ethers, including polyvinylalcohol, polyallylalcohol, polvinylether, and polyallylether;

polymers or copolymers of unsaturated carboxylic acids such as acrylic acid or methacrylic acid;

polymers or copolymers of ester compounds, the ester compound having an unsaturated bond in alcohol residue, including polyvinylesters, such as polyvinylacetate, and polyallylesters, such as polyallylphthalate;

polymers or copolymers of ester compounds having an unsaturated bond in acid residue or both in acid residue and in alcohol residue, including polyacrylic esters, polymethacrylic esters, polymaleic esters, and polyfumaric esters; polymers or copolymers of unsaturated nitriles, including polymer or copolymers of acrylonitrile, polymer or copolymers of methacrylonitrile, polyvinylidenecyanide, and polymer or copolymers of fumaronitrile;

polymers or copolymers of aromatic vinyl compounds, including polystyrene, poly-α-methylstyrene, poly-p-methylstyrene, styrene-α-methylstyrene copolymer, styrene-p-methylstyrene copolymer, and polystyrene halides;

polymers or copolymers of heterocyclic compounds, including polyvinylpyridine, poly-N-vinylpyrolidine, and poly-N-vinylpyrolidone;

polyesters, polycarbonates, and polyamides, for example, nylon 6 and nylon 6,6;

polymers or copolymers each containing one or more kinds of units selected from maleic anhydride unit, and maleimide unit; and heat-resisting organic high molecular compounds, including polyamide-imides, polyetherimides, polyimides, polyphenyleneoxide, polyphenylenesulfide, polysulfones, polyethersulfones, and polyallylates.

The adhesives, whether they are used separately or they are mixed into the liquid crystalline material, may by various polymers which have been commonly used as adhesive, including epoxy adhesives, acrylic adhesives, polyurethane adhesives, hot melt adhesives, and elastomer adhesives.

Further, other additives, such as polychromatic coloring matters or agents for reducing viscosity, may also be added to the liquid crystal material.

Some examples of the polychromatic coloring matters include styryl coloring matters, azomethine coloring matters, azo coloring matters, naphthoquinone coloring matters, anthraquinone coloring matters, merocyanine coloring matters, benzoquinone coloring matters, and tetrazine coloring matters.

The substrates to be used in the present invention may be of various materials such as glass and plastics. From the view-point of productivity, wide uses, and processability, generally, plastic substrates having flexibility may be suitably used. Some examples of the plastic substrates having flexibility include substrates made of crystalline polymers, such as uniaxially or biaxially stretched polyethyleneterephthalate; non-crystalline polymers, such as polysulfones and polyether sulfones; polyolefins, such as polyethylene and polypropylene; polycarbonates; polyamides such as nylons. Among these, the particularly preferred are substrates made of uniaxially stretched polyethyleneterephthalate, polyether sulfones, and polycarbonates.

The shapes of the substrates to be used in the present invention are not particularly limited, and may be selected from various shapes depending on the purpose of use, etc. Generally, substrates of board form, sheet form or film form may be suitably used. Substrates of lengthy film form are generally suitable because of their particular applicability to continuous orientation system.

The thickness of the substrates may be properly selected according to the properties of the substrates used, including transparency of the substrates, the degree of flexibility, strength, processability, and to the use of the resulting liquid crystal devices. Generally, the thickness of the substrates is from 20 to 1,000 μm. The preferred thickness of the layer of liquid crystal material is from 0.5 μm to 100 μm, and the thickness may be varied according to the types of the liquid crystal devices or the use thereof.

The electrode structures carried by the substrates may be of materials which are commonly used in liquid crystal devices, including conductive inorganic film such as metal film and film of conductive oxides and conductive organic film.

In cases where a liquid crystal material enclosed in a liquid crystal device is oriented by the method of the present invention, the two substrates may be of materials identical to each other or may be of materials different from each other. Generally, at least one of the substrates used is an optically transparent substrate on which an optically transparent or semitransparent electrode structure is provided.

Some examples of the transparent or semitransparent electrode which may be used include tin oxide film, which is called NESA film, film of indium oxide mixed with tin oxide, which is called ITO film, evaporated film of gold or titanium, and thin film of other metals or alloys. These electrode may be provided on the predetermined area of the surfaces of the substrates or liquid crystal layers using various known techniques, such as evaporation technique, printing technique, application technique, plating technique, bonding technique, or combination thereof.

The shapes of these electrode structures are not particularly limited, and an electrode structure may cover all over the predetermined surface, such as the surface of substrate, or may be of striped shape, or may be of any other desired shape.

Orientation films are not necessarily provided on the electrode structures. (Herein, the word "orientation film" means a film of material oriented in a desired direction for causing orientation of liquid materials.) In cases where a ferroelectric liquid crystal material is used as the liquid crystal material, it is rather preferable to provide no orientation film, thereby preventing the bistable characteristic of ferroelectric liquid crystals from being decreased by the orientation film. If desired, insulating layers for preventing accidental continuity, color filters, etc. may be provided between electrode structures and liquid crystal material layers. Some examples of the materials for the insulating layers include high molecular compounds such as polymides and epoxy resins and inorganic compounds such as $SiO_2$ or SiO.

According to the method of the present invention, an electric field and an shearing force are applied to the above-described liquid crystal materials at the same time.

The wave form of the applied voltage for applying an electric field may be of various forms such as direct current or alternative current, and may be applied continuously or intermittently. The maximum value of the electric field strength is preferably from 0.1 to 150 MV/m. The partricularly preferred maximum value is from 5 to 100 MV-m. If the maximum value of the electric field strength is less than 0.1 MV/m, the liquid crystal material may not be oriented sufficiently, and on the other hand, if it exceeds 150 MV/m, dielectric breakdown may be caused in the liquid crystal material.

Figure 4:
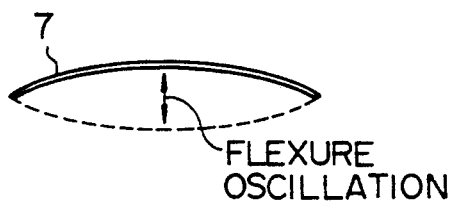
FIG. 4 is a view illustrating the method of an embodiment according to the present invention wherein a flexural oscillation is being applied to a liquid crystal device to apply a shearing force to the liquid crystal material enclosed in the liquid crystal device.

The shearing force is applied once in one direction, or in a reciprocating motion, or a plurality of times. The amplitude of shearing is preferably from 0.1 μm to 5 mm. The particularly preferred amplitude is from 0.5 μm to 1 mm. The shearing speed scarcely affects the resulting orientation state. When substrates made of glass or the like are used, application of shearing force may be performed by slipping the substrates facing each other using micro meter or the like, or by applying acoustic oscillation using electromagnetic devices or the like. As shown in FIG. 4, application of shearing force may also be performed by applying flexure oscillation to liquid crystal devices. When flexible substrates are used, application of shearing force to liquid crystal materials can be easily performed by bending the liquid crystal devices enclosing the liquid crystal materials. It is also possible to apply a shearing force to the liquid crystal material during formation of film of the liquid crystal material by forming the film of the liquid crystal material using a bar coater.

In order to apply a shearing force to a liquid crystal material, it is necessary to conduct the above-described shearing operations at a temperature lower than the tempmerature at which the liquid crystal material exhibits isotropic phase or a mixed phase of isotropic phase and a liquid crystal phase. There is no necessity for heating the liquid crystal material to a temperature at which it exhibits isotropic phase, and generally, application of shearing force can be performed at room temperature. If liquid crystal materials are heated over the temperature at which they exhibit isotropic phase, the distance between the electrode structures facing each other is varied by Coulomb force, and continuity may be caused between the electrode structures facing each other. Further, at the temperature at which the liquid crystal materials exhibit isotropic phase, the flowability of the liquid crystal materials is so large that the shearing force is relieved at once. On the other hand, if the temperature is so low that the liquid crystal materials exhibit glass phase or crystal phase, it is hard to orient the liquid crystal materials because sufficient shearing strain cannot be applied to the liquid crystal materials. It is particularly preferable to conduct the shearing operation at a temperature at which the liquid crystal material used does not exhibit isotropic phase but exhibits a liquid crystal phase. Concretely, the preferred temperatures include those at which the liquid crystal material exhibits a nematic phase (N phase), a cholesteric phase (Ch phase), various kinds of smectic phases (Sm phases), or a mixed phase thereof. It is particularly preferable to apply a shearing force at a temperature at which the liquid crystal material used exhibits a smectic phase.

For instance, in orienting ferroelectric liquid crystal materials, all of the conventional orientation methods require cooling of liquid crystal material from isotropic phase temperature, but the method of the present invention has no necessity for such cooling. According to the method of the present invention, very good uniaxially homogeneous orientation can be brought about at once even at room temperature. The reason is deemed to be that application of electric field largely facilitates the liquid crystal molecules's reorienting caused by the shearing force applied.

FIG. 1 is a sectional view illustrating a liquid crystal material 1 being formed into a film using a bar coater while a shearing force generated by the film forming is being applied to the liquid crystal material. Reference numeral 3 represents a substrate bearing an electrode structure on its upper surface. The substrate 3 is coated with the liquid crystal material 1 on its electrode side. The bar 2 of the bar coater has conductivity, and an electric field is applied to the liquid crystal material 1 by applying a voltage between the bar 2 and the electrode structure of the substrate 3 placed on a fixed bed 4. Thus, simultaneous applications of an electric field and a shearing force to the liquid crystal material 1 can be easily performed.

Figure 2:
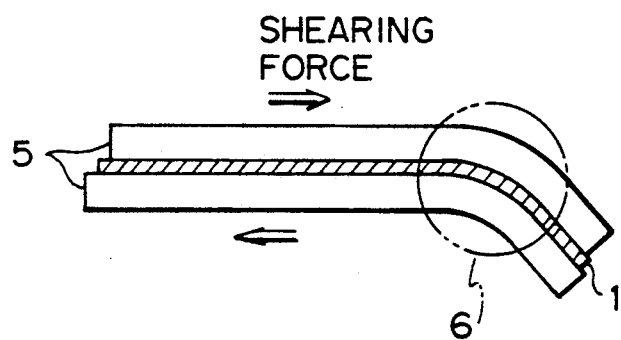
FIG. 2 is a schematic view illustrating a liquid crystal device enclosing a liquid crystal material being bent to apply a shearing force to the liquid crystal material.

FIG. 2 is a schematic view illustrating a liquid crystal material disposed between two flexible substrates being bent. A liquid crystal material 1 is supported between two flexible substrates 5 bearing on their surfaces facing each other their respective electrode structures, and a shearing force generated by bending is applied to the liquid crystal material in a bending portion 6 and close to the bending portion 6. Application of a shearing force over the whole liquid crystal device can be performed by moving the bending portion gradually. For instance, the application of a shearing force over the whole liquid crystal device can be performed by bringing the liquid crystal device into contact with the surface of at least one roll to bend the liquid crystal material and moving the contact area of the liquid crystal device gradually. When the liquid crystal device is bent with rolls, the liquid crystal device may also be bent in a form supported between two belts. Both a shearing force and an electric field are applied at the same time to the liquid crystal material by applying a voltage between the electrode structures facing each other while the bending is going.

Figure 3:
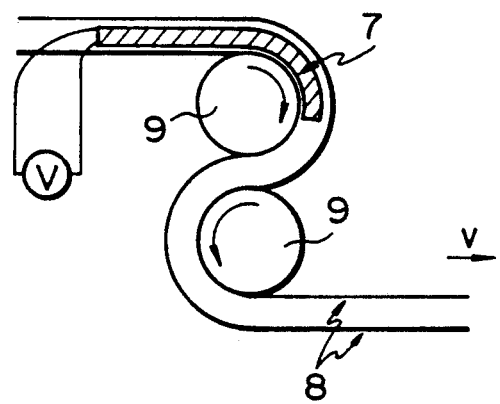
FIG. 3 is a sectional view illustrating the method of an embodiment according to the present invention wherein a liquid crystal material enclosed in a liquid crystal device is being oriented by bending the liquid crystal device to apply a shearing force to the liquid crystal material while an voltage is being applied between electrode structures facing each other to apply an electric field to the liquid crystal material.

FIG. 3 is a sectional view illustrating both a shearing force and an electric field being applied to a liquid crystal material by bending the liquid crystal device enclosing the liquid crystal material using a roller consisting of two rolls while a voltage is being applied to the electrode structures in the liquid crystal device. A reference numeral 7 represents a liquid crystal device wherein a liquid crystal material is supported between two flexural substrates bearing on their surfaces facing each other their respective electrode structures. The liquid crystal device 7 supported between two plastic plates 8 for supporting liquid crystal devices is moved with the two exposed sides of the plastic plates 8 brought alternatively into contact with the surfaces of the rolls 9 respectively, thereby applying a shearing force generated by bending to the liquid crystal material enclosed in the liquid crystal device 7. During the bending, a voltage from a power source is applied through electric wires between the two electrode structures carried respectively by the flexible substrates facing each other, so that an electric field is applied to the liquid crystal material arranged between the electrode structures. Thus, an electric field and a shearing force can be easily applied to the liquid crystal material at the same time.

In the method illustrated in FIG. 4, a shearing force is applied to the liquid crystal material enclosed in a liquid crystal device 7 by causing flexure oscillation.

In cases where a shearing force is applied to a liquid crystal material by bending the liquid crystal device enclosing the liquid crystal material, the use of a roller consisting of at least one conductive or orientation roll enables simultaneous applications of an electric field and a shearing force to be performed efficiently. In this case, the liquid crystal device is bent by bringing its surface to the surface of the conductive orientation roll while a voltage is applied to the conductive orientation roll. It is preferable to bring the electrode structure of at least one of the two flexible substrates of the liquid crystal device into contact with the surface of the conductive orientation roll.

The conductive orientation roll may have conductivity in a part of its surface or over all its surface. The material of the conductive orientation roll may be metals and plastics, rubber, etc. having conductivity. The preferred surface resistance of the conductive orientation roll is not more than $10^5$ $\Omega/\square$, and the particularly preferred is not more than $10^4 \Omega/\square$. If the surface resistance is too large, it may become difficult to apply a sufficient electric field to the liquid crystal material, resulting in an insufficient orientation of the liquid material. The diameter of the conductive orientation roll is preferably from 10 to 1,000 mm, particularly preferably from 20 to 200 mm. If the diameter is too large, it may become difficult to apply a sufficient shearing force to the liquid crystal material, and if it is too small, there may occur delamination or cracking of the liquid crystal device. The preferable diameter is also applicable to orientation rolls having no conductivity.

When a roller consisting of at least two conductive orientation rolls is used, application of an electric field may be performed by applying a voltage between the two conductive orientation rolls. It is preferable to bring the two electrode structures of a liquid crystal device into contact with the two orientation rolls respectively so that a voltage is directly applied between the electrode structures. In order to bring the electrode structures of a liquid crystal device into contact with the conductive orientation rolls, it is desirable to expose a part of each electrode structure by producing a liquid crystal device using two flexible substrates which bear their respective electrode structures and have widths different from each other, or by overlapping two flexible substrates bearing their respective electrode structures and having the same size so that a part of each electrode structure is exposed in the protruding part of each flexible substrate bearing the electrode structure.

The above-described method wherein a roller consisting of at least two conductive orientation rolls is used can be efficiently conducted using the apparatus of the present invention. The apparatus comprises (a) a conveyance means for conveying a liquid crystal device; (b) a roller having at least two conductive orientation rolls for bending the conveyed liquid crystal device by bringing the liquid crystal device into contact with the surfaces of the two conductive orientation rolls; (c) a means for applying a voltage between the two conductive orientation rolls while the liquid crystal device is being bent; and (d) a receiving means for receiving the liquid crystal device which has gone through the bending. When the liquid crystal device is a lengthy liquid crystal device, a supply roll for supplying the lengthy liquid crystal device rolled thereon may be suitably used as the conveyance means, and a winder roll for winding the lengthy liquid crystal device which has gone through the bending may be suitably used as the receiving means. When the liquid crystal device is a cut-sheet of liquid crystal device, it is desirable that the conveyance means consists of a plurality of rolls for conveying the cut-sheet of liquid crystal device, and the receiving means consists of a plurality of rolls for receiving the cut-sheet of liquid crystal device.

Figure 5:
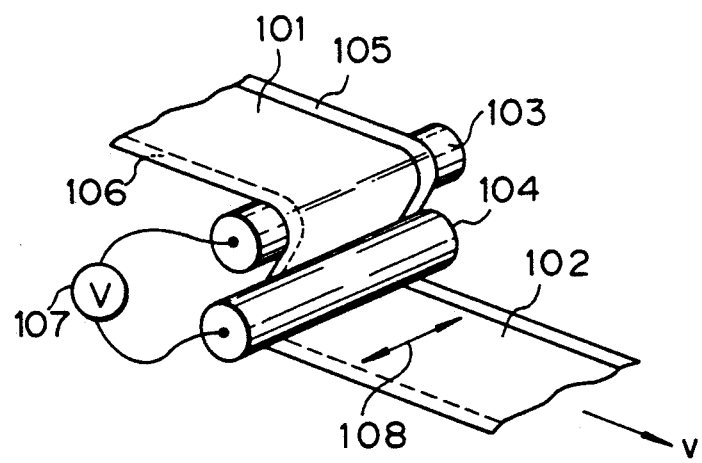
FIG. 5 is a view illustrating the apparatus of an embodiment according to the present invention. Provided that the conveyance means for supplying and conveying a lengthy liquid crystal device, and the receiving means for receiving the liquid crystal device which has gone through bending are not shown.

FIG. 5 is a view illustrating the apparatus of an embodiment according to the present invention wherein two conductive orientation rolls are used for orienting a lengthy liquid crystal device. Provided that the conveyance means for supplying and conveying a lengthy liquid crystal device and the receiving means for receiving the liquid crystal device which has gone through bending are not shown. A reference numeral 101 represents a lengthy liquid crystal device wherein a ferroelectric liquid crystal material is supported between two flexible substrates bearing on their surfaces facing each other their respective electrode structures, and the liquid crystal device is not yet oriented. In the liquid crystal device 101, the two flexible substrates bearing their respective electrode structures are so arranged that they overlap to each other, thereby exposing their electrode structures in the protruding parts thereof. Reference numerals 105 and 106 represent the exposed surfaces of the electrode structures respectively. In this apparatus, the roller for orientation consists of two conductive orientation rolls 103 and 104, and the means for applying a voltage is a power source 107 which applies a voltage between the two orientation rolls 103 and 104. The unoriented liquid crystal device 101 supplied from a supply roll (not shown) is bent be passing it through the two conductive orientation rolls 103 and 104 with its both sides brought into contact with the surfaces of the rolls in turn, and thus, a shearing force generated by the bending is applied to the liquid crystal material enclosed in the unoriented liquid crystal device 101. While the unoriented liquid crystal device 101 is being bent, the exposed surfaces 105 and 106 of the electrode structures in the parts protruding at the both sides of the liquid crystal device are brought into contact with the surfaces of the conductive orientation rolls 104 and 103 respectively. Because a power source is connected to the conductive orientation rolls 103 and 104 to apply a voltage between the two rolls, the voltage is applied between the exposed surfaces 105 and 106 of the electrode structures, and an electric field and a shearing force are applied to the liquid crystal material at the same time. In case where the liquid crystal material is a ferroelectric liquid crystal material, the normal of smectic layers is aligned at a right angle to the direction of shearing, i.e. in the direction as shown by the arrow 108. The oriented liquid crystal device 102 is then wound on a winder roll (not shown).

In the above-described apparatus, supplementary rolls may be arranged, for example, at the position where the lengthy liquid crystal device is introduced into the roller, according to demand. Also, driving devices such as motors may be arranged to move the lengthy liquid crystal device at a line speed v.

Further, it is desirable to vary the temperature of each roll according to demand or to put the whole apparatus in a thermostatic chamber so that the temperature of the liquid crystal material is adjusted to a desired temperature lower than the temperature at which the liquid crystal material exhibits isotropic phase or a mixed phase of isotropic phase and a liquid crystal phase.

In case where the liquid crystal device used is a cut-sheet of liquid crystal device, the apparatus as shown in FIG. 6 may be suitably used. With the proviso, the receiving means for receiving the liquid crystal device which has been oriented is not shown. FIG. 7(a), FIG. 7(b), and FIG. 7(c) are respective schematic views illustrating the movement of the rolls of the apparatus shown in FIG. 6. In this apparatus, the conveyance means consists of seven rolls 109. A reference numeral 110 represents an unoriented liquid crystal device wherein its substrates are so arranged that they overlap to each other and the surfaces of their respective electrode structures are exposed partially in the same manner as the liquid crystal device shown in FIG. 5. A reference numeral 109 represents seven rolls for conveying cut-sheets of liquid crystal device, a reference numeral 110 represents a cut-sheet sheet of liquid crystal device which is not yet oriented, and a reference numeral 111 represents the area at which orientation treatment is carried out using a roller consisting of two nonconductive rubber rolls 112 and 115 and two conductive orientation rolls 113 and 114. The unoriented liquid crystal device 110 is supplied by a group of rolls consisting of seven rolls 109 and is conveyed to the orientation area 111. Subsequently, the rubber roll 112 and the orientation roll 114 are lowered with an air cylinder to the orientation roll 113 and the rubber roll 115 respectively so as to hold the liquid crystal device 110 as shown in FIG. 7(a). The pair of rolls 114 and 115 is then moved down smoothly under the pair of rolls 112 and 113 as shown in FIG. 7(b). Thereafter, as shown in FIG. 7(c), a voltage is applied between the conductive orientation rolls 113 and 114 by the means for applying an voltage 107, and at the same time, the liquid crystal device 110 is moved at a speed of orientation treatment v by the rubber roll 115 connected to a driving motor (not shown). At that time, an electric field and a shearing force are applied simultaneously to the liquid crystal material in the liquid crystal device, thereby orienting the liquid crystal material. In this apparatus, it is desirable to make the temperature at the time of orientation treatment variable by, for example, putting the whole orientation area 111 into a thermostatic chamber.

In another embodiment of the method of the present invention, a shearing force and an electric field are applied simultaneously to a liquid crystal material enclosed in a liquid crystal device by using an orientation roll having on its surface a plurality of conductive parts insulated from each other and using a liquid crystal device wherein the electrode structure of at least one of the flexible substrates consists of a plurality of electrodes insulated from each other and the flexible substrates are so arranged that a parts of each of the plural electrodes is exposed. In this embodiment, a shearing force is applied to the ferroelectric liquid crystal material by bending the liquid crystal device in such a manner that the liquid crystal device is brought into contact with the surface of the conductive orientation roll, with each of the exposed parts of the plural electodes brought into contact with the surface of each of the plural conductive parts of the orientation roll. During the bending, a voltage is applied to each of the plural conductive parts of the conductive orientation roll to apply an electric field to the liquid crystal material disposed between the electrode structures facing each other. When different voltages are applied to the plural conductive parts, different electric field strengths are applied to each part of the liquid crystal material disposed between the plural electrodes of one electrode structure and the other electrode structure.

The embodiment wherein an orientation roll having a plurality of conductive parts is used can be efficently practiced by using another apparatus of the present invention. The apparatus comprises (a) a conveyance means for conveying liquid crystal device, (b) a roller having at least one orientation roll for bending the conveyed liquid crystal device, the orientation roll having on its surface a plurality of conductive parts insulated from each other, (c) a means for applying a vlotage to the conductive parts of the orientation roll, and (d) a receiving means for receiving the liquid crystal device which has gone through the bending. The conveyance means, the means for applying a voltage, and the receiving means are the same as those of the apparatus described above wherein a roller having at least two conductive orientation rolls is used.

Figure 8:
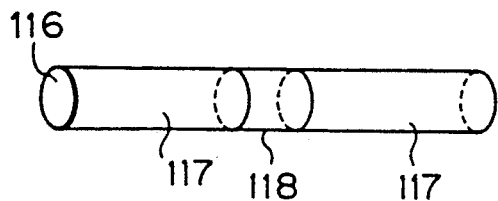
FIG. 8 is a view illustrating an example of the orientation roll to be used in the apparatus of an embodiment according to the present invention.

FIG. 8 is a view showing an example of the orientation roll having a plurality of conductive parts insulated from each other. A reference numeral 116 represents an orientation roll having a surface divided into three regions, the center region being an insulating part 118 made of an insulating material and the both side regions 117 being conductive parts made of a conductive material. The insulating part 118 insulates the conductive parts 117 from each other. When the roller of the apparatus consists of this orientation roll 116 alone, the means for applying a voltage may be so connected as to apply the voltage between the two conductive parts 117.

The following Examples are given to illustrate the present invention in more detail. The scope of the invention is not, however, meant to be limited to the specific details of these Examples.

EXAMPLES 1 TO 10 AND COMPARATIVE EXAMPLES 1 TO 4

EXAMPLE 1

After a glass substrate of 10 cm square (thickness: 0.8 mm) bearing an ITO electrode was heated to 110° C. a ferroelectric liquid crystal having the following structure and properties was placed on the electrode side of the heated glass substrate. Another substrate of the same structure and sizes was placed on the ferroelectric liquid crystal with its electrode side faced to the ferroelectric liquid crystal and was pressed to produce a liquid crystal device having a film thickness of liquid crystal material of 2.5 μm.

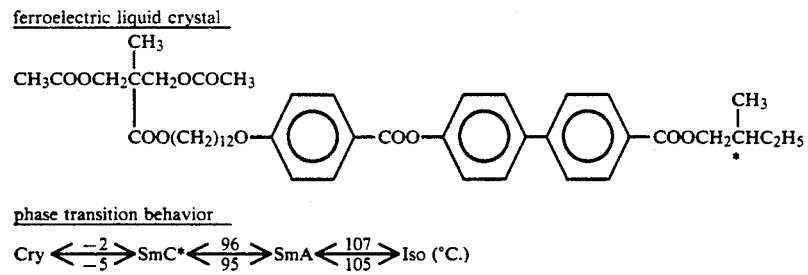

phase transition behavior $$Cry \underset{-5}{\overset{-2}{\rightleftarrows}} SmC^* \underset{95}{\overset{96}{\rightleftarrows}} SmA \underset{105}{\overset{107}{\rightleftarrows}} Iso \ (°C.)$$

(Cry: crystal phase, SmC*: chiral smectic C phase, SmA: smectic A phase, Iso: isotropic phase)

A shearing force of about 2 μm is amplitude and 50 Hz was applied to the liquid crystal device with an electromagnetic device at room temperature while a DC voltage of 20 V was being applied between the ITO electrodes in the liquid crystal device. A uniform uniaxially homogeneous orientation was brought about immediately (withing one second) after the shearing force began being applied. The liquid crystal device which was kept intact and was arranged between two polarizing plates in cross polarization condition. When a voltage of ±5 V was applied between the electrode structures, a contrast of not less than 300 was produced. Even after the electric field was switched off, i.e. even in bistable state, the liquid crystal device exhibited a contrast of not less than 120, showing a well oriented state. From microscopic observation, there was observed almost no zigzag defects peculiar to ferroelectric liquid crystals. The reason is that zigzag defects were dissolved by the relatively large electric field applied during the orientation treatment.

EXAMPLE 2

A liquid crystal devices was produced using the same substrates and procedure as those of Example 1 with the exception that the following low molecular weight ferroelectric liquid crystal which had an anit-ferroelectric phase (SmC$_A$*) was used as the liquid crystal material.

ferroelectric liquid crystal

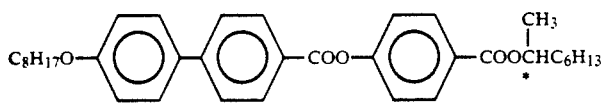

phase transition behavior

The film thickness of the liquid crystal material was 3.2 μm.

The whole liquid crystal device was put on a hot-plate, and at various temperatures, a shearing of about 2 μm in amplitude and 50 Hz was applied between the substrates while a triangular wave voltage of 50 Hz having a peak voltage of 20 V was being applied between the electrodes. At each temperature, the appearance of the liquid crystal device was changed from cloudy to transparent, and when each liquid crystal device was visually observed by supporting it between polarizing plates, uniaxially homogeneous orientation was observed in the liquid crystal material.

The contrast obtained under each condition of temperature is shown in Table 1. The measurements of contrast were conducted in cross polarization condition, ±10 V, and 100° C. Before the orientation was carried out at each temperature, the liquid crystal device was heated to 150° C. and was then cooled rapidly at 50° C./min to make the alignment of liquid crystal molecules random.

TABLE 1

| Orienting temperature (°C.) | Contrast |
|---|---|
| 130 (SmA phase) | 120 |
| 120 (SmC* phase) | 175 |
| 110 (SmC$_A$* phase) | 170 |

As apparent from Table 1, a high degree of orientation can be obtained easily and immediately not only at SmC* phase but also at SmA phase and SmC$_A$* phase (anti-ferroelectric phase).

EXAMPLE 3

A liquid crystal material was prepared by mixing a ferroelectric liquid crystal having the following structure and properties with a red dichromatic coloring matter having the following structure in the following ratios.

ferroelectric liquid crystal

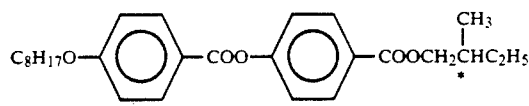

phase transition behavior

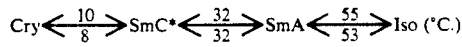

red dichromatic coloring matter

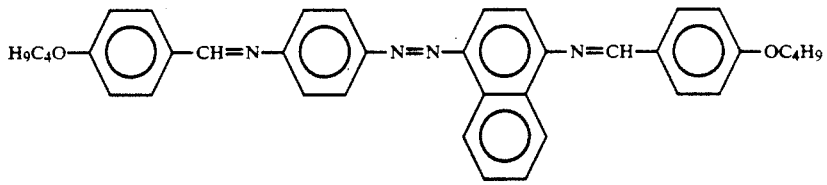

ferroelectric liquid crystal:red dichromatic coloring matter = 99.5:0.5 (weight ratio)

In the same manner as shown in FIG. 1, the liquid crystal material was formed into film on the electrode side of a glass substrate 3 (thickness: 0.8 mm) bearing an ITO electrode at 40° C. using a bar coater, and during the film forming, an electric field was applied to the liquid crystal material while a shearing force generated by the film forming was being applied. The bar 2 of the bar coater was an iron round bar of 2 cm in diameter and 20 cm in width. The moving speed v and load w of the bar 2 were 2 cm/sec and 500 g respectively. The applied voltage between the bar 2 and the ITO electrode of the glass substrate 3 was a DC voltage of V=90 V. After the film forming, another substrate is laminated on the film of the liquid crystal material with its ITO electrode faced the film of the liquid crystal material to produce a liquid crystal device of A-4 size. The contrast ratio was measured in crossed polarization condition to be 90 at an applied voltage of ±5 V, and even in bistable state, the liquid crystal device exhibited a contrast of 75, showing that a very good oriented state had brought about.

EXAMPLE 4

A liquid crystal material having the following properties was prepared by mixing a liquid crystal A and a liquid crystal B having the following structures in the following ratios.

ferroelectric liquid crystal A

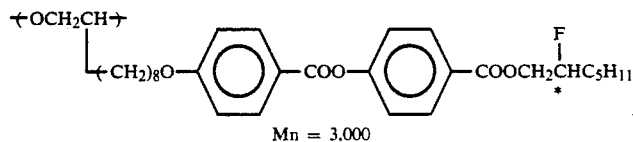

Mn = 3,000 ferroelectric liquid crystal B

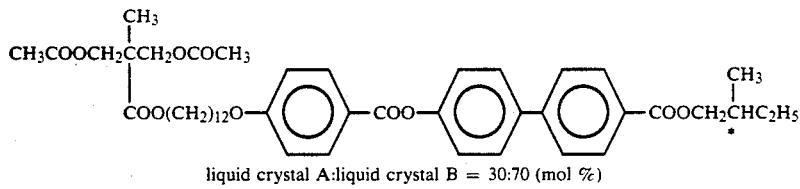

liquid crystal A:liquid crystal B = 30:70 (mol %)

phase transition behavior

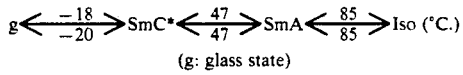

(g: glass state)

A mixture of the obtained liquid crystal material and a polyisobutylmethacrylate (Trade-name: DIANAL BR-105, produced by Mitsubishi Rayon Co., Ltd.) in a weight ratio of 6:1 was dissolved in methylene chloride to form a 10 wt. % solution, and the solution was applied to the electrode side of a polyethersulfone (PES) substrate (width: 300 mm, thickness: 100 μm, length: 50 m, Trade-name: FST-1351, produced by Sumitomo Bakelite Co., Ltd.) bearing an ITO electrode using a microgravure coater. After evaporation of the solvent, the film thickness of the mixture was measured to be 1.8 μm. Subsequently, another PES substrate of the same kind was laminated on the film of the mixture using a pair of pressing rollers, with the ITO electrodes of the substrates facing each other. Thereafter, the obtained laminate was cut off to a length of 500 mm to produce a rectangular liquid crystal device, and the liquid crystal device was subjected to orientation treatment in the same manner as shown in FIG. 3 by bending the liquid crystal device using a roller at room temperature while a DC voltage of 40 V was being applied between the ITO electrodes from a power source through electric wires. The two orientation rolls 9 of the roller were metal rolls of 80 mm in diameter, and the moving speed V of the plastic plates 8 for supporting the liquid crystal device was adjusted to 5 m/min. After the orientation treatment, contrast was measured to be 410 at 25° C. at an applied voltage of ±5 V, and in bistable state, the obtained contrast was so good as 160.

COMPARATIVE EXAMPLE 1

When the same procedure (bending) as in Example 4 was repeated at room temperature with the exception that no electric field was applied, orientation scarcely occurred. Contrast was measured to be not more than 1.5 at 25° C. at an applied voltage of ±20 V, and from microscopic observation, there were observed small domains of less than several μm in size wherein the liquid crystal molecules were randomly aligned.

EXAMPLE 5

In the same manner as in Example 4, a film of a nematic liquid crystal having the following structure and properties was formed on the electrode side of a uniaxially stretched PET substrate (thickness: 100 μm, width: 200 mm, length: 20 m) bearing an ITO electrode, to obtain a film of 12.2 μm in thickness.

nematic liquid crystal

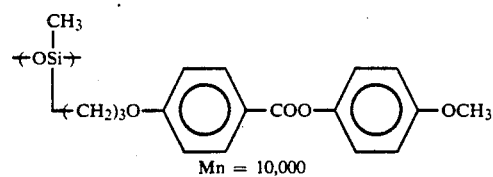

Mn = 10,000 phase transition behavior

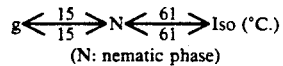

(N: nematic phase)

After another substrate of the same kind was laminated in the same manner as in Example 4, the obtained laminate was cut off to a length of 200 mm to obtain a liquid crystal device. When an atlernative-current voltage of 70 V and 3 KHz was applied between the electrodes while a flexure oscillation of 1 cm in amplitude and 1 Hz in oscillation frequency was being applied to the whole liquid crystal device in the same manner as shown in FIG. 4, the whole liquid crystal device turned transparent in about 10 seconds. From observation with a polarizing microscope, it became apparent that complete homeotropic orientation was brought about into the liquid crystal material.

COMPARATIVE EXAMPLE 2

When only a flexure oscillation was applied to the liquid crystal device produced in the same manner as in Example 5 without applying any voltage, homeotropic orientation was never brought about even after about one minute, and on the contrary, there were shown a slight sign of uniaxially homogeneous orientation near the edges of the liquid crystal device.

COMPARATIVE EXAMPLE 3

When an alternative-current voltage of 70 V and 3 KHz was applied to a liquid crystal device produced in the same manner as in Example 5 without applying any flexure oscillation, there was observed almost no change after 10 seconds, and homeotropic orientation of the same degree as that obtained in Example 5 was brought about after about 5 minutes. It was necessary to heat the whole liquid crystal device to not less than 50° C. for bringing about homeotropic orientation of the same degree as that obtained in Example 5 within dozens of seconds.

EXAMPLE 6

The electrodes of two flexible substrates bearing their respective electrodes which were rolled-type PES substrates (100 μm in thickness, 200 mm in width, and 50 m in length, Trade-name: FST-1351, produced by Sumitomo Bakelite Co., Ltd.) bearing ITO film electrodes were etched to form one into striped form having the width of each stripe of 1.6 mm and the gap between neighboring stripes of 0.1 mm, the stripes extending in the longitudinal direction of its substrate, and the other into the same striped form with the proviso that the stripes extended in the direction making a right angle to the longitudinal direction of the substrate. Subsequently, a solution was prepared by mixing a liquid crystal having the following structure and properties and the following adhesive in a weight ratio of 4:1 and dissolving the mixture into dichloromethane to form a 15% by weight solution. The solution was continuously applied to the electrode side of one of the substrates using a direct gravure coater.

electrode sides arranged on the opposed surfaces of the two substrates.

Figure 10:
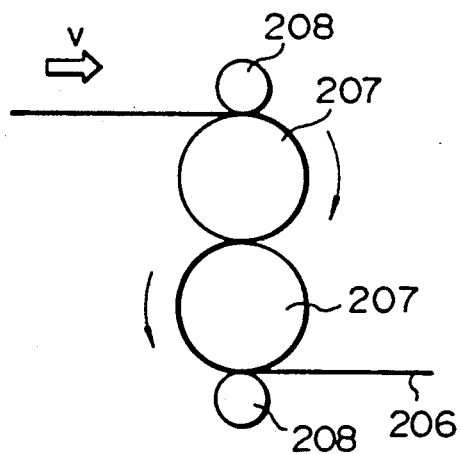
FIG. 10 is a schematic view illustrating the method of an embodiment according to the present invention which was used in Example 6 wherein a liquid crystal device is bent while a voltage is being applied between two electrode structures facing each other.

A liquid crystal device of 200 mm in width and 400 mm in length was then cut out from the laminate, and was then bent at room temperature with an apparatus as shown in FIG. 10 while an alternative-current voltage of 35 V and 50 Hz was being applied between the electrodes facing each other. In FIG. 10, a reference numeral 207 represents a pair of rolls for bending, and a reference numeral 206 represents supplementary rolls. In this Example, each of the rolls 207 used was a metal roll of 70 mm in diameter, each of the supplementary rolls 206 used was a rubber roll of 40 mm in diameter, and the line speed v was adjusted to 2 m/min. The liquid crystal device which had been cloudy was changed to be transparent immediately after the beginning of the bending treatment. When the transparent liquid crystal device was observed in crossed polarization condition, there was observed that uniaxially homogeneous orientation was brought about selectively to the liquid crystal material in the picture element parts. Thereafter, UV light was irradiated to the liquid crystal device with a metal halide lamp to cure the adhesive used.

Figure 9A:
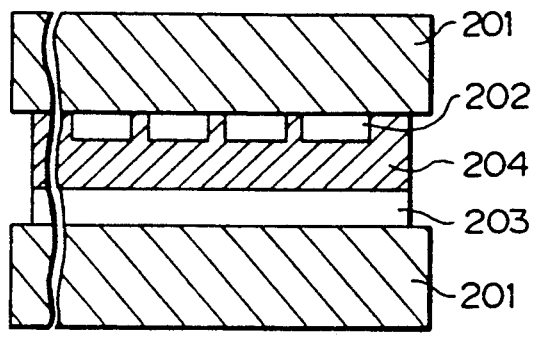
FIG 9(a) is a partially sectional view of the dot matrix liquid crystal device produced in Example 6.
Figure 9B:
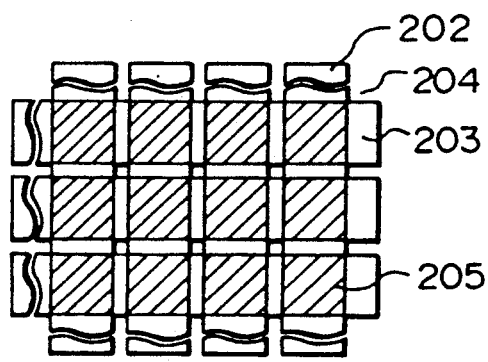
FIG. 9(b) is a plane view schematically illustrating the arrangement of the upper and lower electrode structures in the dot matrix liquid crystal device shown in FIG. 9(a).

FIG. 9(a) and FIG.(b) show the structure of the obtained dot matrix liquid crystal device. FIG. 9(a) is a partially sectional view of the dot matrix liquid crystal device, and FIG. 9(b) is a plane view thereof, with the proviso that flexible substrates are not shown in FIG. 9(b). A reference numeral 201 represents the flexible substrates used, a reference numeral 202 represents the upper striped electrode, a reference numeral 203 represents the lower striped electrode, and a reference numeral 204 represents the ferroelectric liquid crystal material used in this Example. The upper striped electrode 202 and the lower striped electrode 203 facing each other are so arranged that they approximately make a right angle, and the ferroelectric liquid crystal material 204 is disposed between them. In the film of the ferroelectric liquid crystal material, uniaxially homogeneous orientation has been brought about selectively to the picture element parts 205 sandwiched between the electrodes facing each other.

When contrast was measured by applying a DC voltage of ±5 V between the electrodes of the obtained dot ferroelectric liquid crystal

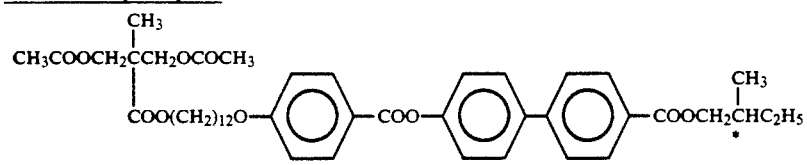

phase transition behavior

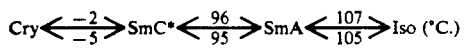

adhesive

UV curing acrylic adhesive
Trade-name: CEMEROCK SUPER Y862-1 produced by Cemedine Co., Ltd.

After evaporation of the solvent, the film of the liquid crystal material had a film thickness of 2.8 μm. The other substrate, which had been coated with nothing, was laminated on the film of the liquid crystal material using a laminator consisting of a pair of rolls, one being a metal roll and the other being a rubber roll, with the matrix liquid crystal device facing each other at 25° C. in crossed polarization condition, the contrast in the region of the picture element parts was measured to be 105. On the other hand, the other part exclusive of the picture element parts was black, thereby producing good visibility of dot display. When the degree of orientation in the part exclusive of the picture element parts was studied by rotating the liquid crystal device in crossed polarization condition, the ratio between the maximum value and the minimum value of the strength of transmitted light was not more than 1.02, showing that the molecular alignment was almost random. Further, the oriented liquid crystal material exhibited good bistability and good threshold property in responding to changes of electric field, and when the liquid crystal device was operated at 25° C. in dynamic drive at 20 V of pulse height and 0.4 ms of pulse length, letters and patterns having contrast of not less than 50 in the bistable state were displayed.

COMPARATIVE EXAMPLE 4

The same kinds of substrates and liquid crystal material as those used in Example 6 were used. A pyrrolidone solution (0.5% by weight) of a polyamic acid (Trade-name: SP-910, produced by Toray Co., Ltd.) was previously applied on the electrode sides of the lower and upper substrates bearing their respective striped ITO electrodes. After the solvent in the applied film was dried with warm wind of 100° C., each substrate was wound up on a roll. The rolled substrates were heated in a heating oven at 180° C. for 3 hours, to convert the polyamic acid to polyimide. Thereafter, the substrates were drawn out from the rolls, and cloth for rubbing was pressed to them while they were drawn away at a line speed of 5 m/min to carry out rubbing treatment. The rubbed substrates were wound up on rolls again, and the rolled substrates were washed with pure water. The liquid crystal material was then applied to the polyimide film of one of the coated substrates in the same manner as in Example 6, and the other substrate was laminated in the same manner as in Example 6. No adhesive had been added to the liquid crystal material in order to prevent the orienting function brought about to the polyimide film by the rubbing treatment from being reduced. After the obtained liquid crystal device was wound up on a roll, the rolled liquid crystal device was heated to 109° C. in an oven and was then immediately cooled at 2° C./min. After orientation was completed at 95° C., the rolled liquid crystal device was cooled to room temperature at 20° C./min.

Subsequently, a liquid crystal device of 200 mm in width and 400 mm in length was cut out from the rolled liquid crystal device. When contrast was measured in the same manner as in Example 6, the picture element parts exhibited a contrast of 42 in crossed polarization condition. The other part exclusive of the picture element parts was also bright, and fine regions in which the liquid crystal molecules tilted $\pm\theta$ (tilting angle) were observed in the part. Therefore, the rectangular shape of each picture element part could not be sharply visualized, resulting in poor visibility of dot display. When the liquid crystal device was operated in dynamic drive in the same manner as in Example 6, the contrast in bistable state was measured to be about 16.

EXAMPLE 7

CS-1026 (Trade-name, produced by Chisso Co., Ltd.) was used as a ferroelectric liquid crystal. A mixture of the ferroelectric liquid crystal and an epoxy resin (Trade-name: HIGH SUPER, produced by Cemedine Co., Ltd., mixture of a main agent and a hardening agent (1:1 in volume ratio)) in a weight ratio of 4:1 was dissolved in dichloromethane to form a 15% by weight solution. The solution was applied to the electrode side of a PES substrate (thickness: 100 μm, width: 150 mm, length: 20 m) bearing ITO electrode using a microgravure coater, to form a film. After evaporation of the solvent, the film thickness of the liquid crystal material was 2.2 μm. Subsequently, the same kind of PES substrate bearing ITO substrate, which was coated with nothing, was laminated to the coated substrate so that their ITO electrodes were brought into contact with the layer of the liquid crystal material, to produce an unoriented liquid crystal device. At the time of lamination, the substrates were arranged as shown in FIG. 5 so that a part of each electrode was exposed. Thereafter, a liquid crystal device was cut off to 10 m long, and was then subjected to orientation treatment using the apparatus as shown in FIG. 5. The two conductive orientation rolls 103 and 104 were SHIN-ETSU SR ROLL (Trade-name of a silicone conductive rubber roll produced by Shin-etsu Polymer Co., Ltd., length: 200 mm, diameter: 40 mm, surface resistance: $3 \times 10^2$ Ω/□). The power source 107 was of DC 20 V, and the circumstance temperature was room temperature at which the liquid crystal material exhibited chiral smectic C phase. After conclusion of the orientation treatment, a liquid crystal device of several centimeters square was cut out from the lengthy liquid crystal device 102. The liquid crystal device was arranged in crossed polarization condition and contrast (transmittance ratio) was measured at 25° C. by appyling a voltage of $\pm 5$ V between the electrodes of the liquid crystal device. The same measurements were carried out on liquid crystal devices produced using the same apparatus with the proviso that the line speed V was varied. The results are shown in Table 2.

TABLE 2

| Relation between line speed and contrast | | | |
|---|---|---|---|
| Line speed (m/min) | 0.5 | 2 | 10 |
| Contrast at room temperature | | | |
| During application of voltage | 55 | 59 | 45 |
| In bistable state | 51 | 53 | 35 |

The results show that sufficient degree of orientation can be produced even if the line speed is varied in a wide range, and it means that the method of the present invention can be incorporated in a continuous process including film forming of liquid crystal materials and lamination of substrates, etc. The contrast in bistable state was also very good, and observation with a polarizing microscope showed that the reason was that there was few or no zigzag defects. The reason seems to be that the application of voltage during the orientation treatment brings about so-called bookshelf structure, wherein the layer structure of smectic phase approximately makes a right angle to substrates.

EXAMPLE 8

A ferroelectric liquid-crystalline polymer having the following structure and properties was used as the liquid crystal material.

ferroelectric liquid-crystalline polymer

-continued

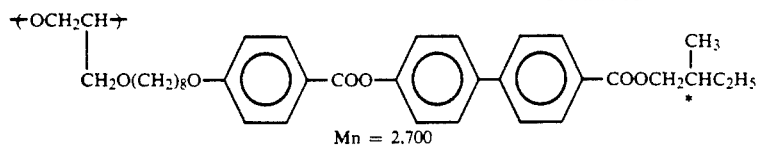

phase transition behavior

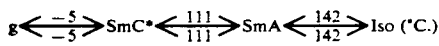

A 10% by weight solution of the ferroelectric liquid crystal dissolved in dichloromethane was applied to the electrode side of a polycarbonate substrate (thickness: 100 μm, width: 200 mm, length: 10 m) bearing an ITO electrode using a direct gravure coater to form a film of liquid crystal material. After evaporation of the solvent, the same kind of substrate coated with nothing was laminated on the film of liquid crystal material, with the electrode sides of the substrates faced each other. At the time of the lamination, the substrates were arranged as shown in FIG. 5 so that a part of each of the electrodes facing each other was exposed. The thickness of the film of liquid crystal material was 1.9 μm. Thereafter, liquid crystal devices of 1 m long were cut out from the laminate, and were then subjected to orientation treatment using the same apparatus as that used in Example 7.

The temperatures of the orientation rolls 103 and 104 were varied with every orientation treatment, with the line speed v fixed to 5 m/min. Measurements of contrast were carried out on the liquid crystal devices oriented at the varied temperatures of the orientation rolls in the same manner as in Example 7, and the results are shown in Table 3. The applied voltage between the orientation rolls was a rectangular wave of V = ±40 V and 5 Hz.

TABLE 3

Relation between the temperatures of orientation rolls and contrast

| Surface temperatures of the two orientation rolls (°C.) | 25 | 40 | 80 | 100 |
|---|---|---|---|---|
| Contrast at room temperature | | | | |
| During application of voltage | 75 | 80 | 110 | 120 |
| In bistable state | 60 | 72 | 79 | 80 |

As apparent from the results shown in Table 3, sufficient degree of orientation was produced though the temperatures of the orientation rolls were varied in a wide range. Also, the orientation state was so good that almost no zigzag defects was observed.

EXAMPLE 9

An apparatus for orienting treatment as shown in FIG. 6 was constructed. The whole orienting area 111 was placed in a thermostatic chamber so that the temperature during treatment could be varied.

In this Example, the same conductive orientation rolls as those used in Example 7 were used. Cut-sheets of liquid crystal devices of 20 cm long were cut out from the unoriented liquid crystal device produced in Example 8, and they were subjected to orientation treatment using the above-described apparatus. The temperature in the thermostatic chamber was fixed to 40° C., and the voltage applied between the orientation rolls 113 and 114 was adjusted to a DC voltage of 30 V. Measurements of contrast were carried out on the liquid crystal devices oriented at various orientation speed v, and the results are shown in Table 4.

TABLE 4

Relation between line speed and contrast

| Orientation speed v (m/min) | 0.5 | 2 | 10 |
|---|---|---|---|
| Contrast at room temperature | | | |
| During application of voltage | 75 | 84 | 105 |
| In bistable state | 65 | 70 | 85 |

As apparent from the results shown in Table 4, it was confirmed that a good orientation state could be brought about even into relatively small cut-sheet of liquid crystal devices under moderate conditions.

EXAMPLE 10

Figure 11A:
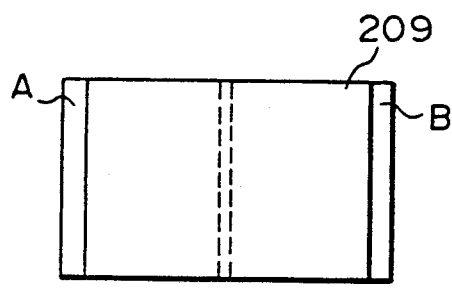
FIG. 11(a) is a plane view of the liquid crystal device produced in Example 10.
Figure 11B:
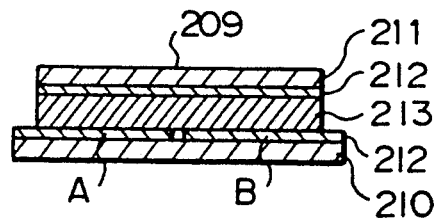
FIG. 11(b) is a sectional view of the liquid crystal device shown in FIG. 11(a).

The procedures of application and lamination of Example 8 were repeated using the same liquid crystal and substrates as those used in Example 8 to produce a liquid crystal device 209 of 200 mm in width and 150 mm in length as shown in FIG. 11(a) and FIG. 11(b). As shown in FIG. 11(b), the ITO electrode structure 212 on one substrate 210 of the liquid crystal device 209 was divided into electrode A and electrode B. The substrate 210 bearing the electrode A and the electrode B had a larger width than the other substrate 211, and a part of electrode surface of each of the electrode A and the electrode B was exposed at an edge portion of the liquid crystal device 209.

The liquid crystal device was subjected to orientation treatment using a roller consisting of one orientation roll 116 as shown in FIG. 8. The conductive parts 117 of the orientation roll 116 were made of a conductive silicone rubber having a surface resistance of $10^2 \, \Omega/\square$, and the insulating part 118 was made of a nonconductive silicone rubber. The rolls were 50 mm in diameter and 300 mm in width.

Figure 12:
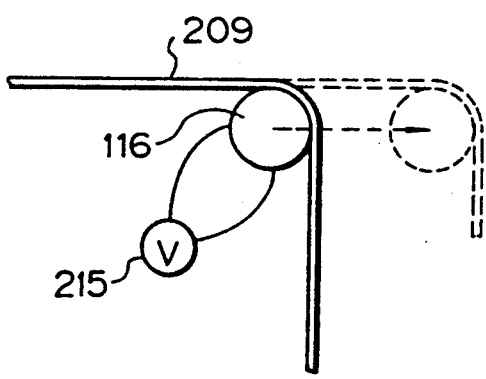
FIG. 12 is a view illustrating the liquid crystal device produced in Example 10 being oriented by the method of an embodiment according to the present invention.

While a rectangular wave voltage of ±40 V and 20 Hz was being applied between the two conductive parts 117 of the orientation roll 116, a shearing force generated by bending was applied to the liquid crystal material in the liquid crystal device 209 by bringing the liquid crystal device 209 into contact with the roll surface of the orientation roll 116 as shown in FIG. 12 at 25° C., with the electrode A and the electrode B brought into contact with the two conductive parts 117, respectively. In this Example, the orientation roll 116 was moved so that an electric field and a shearing force were applied to the whole liquid crystal device 209. After completion of the orientation treatment, contrast was measured in crossed polarization condition to be 70 at an applied voltage of ±5 V at 25° C. It shows that even a roller consisting of only one roll can bring about desired degrees of orientation sufficiently.

What is claimed is:

1. A method of orienting a liquid crystal material, comprising; orienting the liquid crystal material by applying a shearing force to the liquid crystal material while an electric field is being applied to the liquid crystal material.

2. The method as claimed in claim 1, wherein the liquid crystal material has a liquid crystal phase selected from the group consisting of nematic phases, smectic phases, and cholesteric phases.

3. The method as claimed in claim 1, wherein the liquid crystal material has a ferroelectric smectic phase.

4. The method as claimed in claim 1, wherein the liquid crystal material is oriented by coating a substrate bearing an electrode structure with the liquid crystal material on the electrode side of the substrate using a bar coater having a conductive bar for coating, at a temperature lower than the temperature at which the liquid crystal material exhibits isotropic phase or a mixed phase of isotropic phase and a liquid crystal phase, while a voltage is being applied between the electrode structure of the substrate and the conductive bar of the bar coater, so that a shearing force generated by the coating of the liquid crystal material is applied to the liquid crystal material while an electric field is being applied to the liquid crystal material.

5. The method as claimed in claim 1, wherein the liquid crystal material is enclosed in a liquid crystal device which comprises two substrates supporting the liquid crystal material between them and bearing on their surfaces facing each other their respective electrode structures, and
the liquid crystal material is oriented by applying a shearing force to the liquid crystal material while an electric field is being applied to the liquid crystal material.

6. The method as claimed in claim 5, wherein the liquid crystal material enclosed in the liquid crystal device is oriented by applying a shearing force generated by acoustic vibration to the liquid crystal material, at a temperature lower than the temperature at which the liquid crystal material exhibits isotropic phase or a mixed phase of isotropic phase and a liquid crysal phase, while an electric field is being applied to the liquid crystal material by applying a voltage between the electrode structures.

7. The method as claimed in claim 5, wherein the liquid crystal material enclosed in the liquid crystal device is oriented by applying a shearing force generated by flexure oscillation to the liquid crystal material, at a temperature lower than the temperature at which the liquid crystal material exhibits isotropic phase or a mixed phase of isotropic phase and a liquid crystal phase, while an electric field is being applied to the liquid crystal material by applying a voltage between the electrode structures.

8. The method as claimed in claim 5, wherein
the substrates bearing their respective electrode structures are flexible substrates bearing their respective electrode structures, and
the liquid crystal material enclosed in the liquid crystal device is oriented by applying a shearing force to the liquid crystal material by bending the liquid crystal device, at a temperature lower than the temperature at which the liquid crystal material exhibits isotropic phase or a mixed phase of isotropic phase and a liquid crystal phase, while an electric field is being applied to the liquid crystal material by applying a voltage between the electrode structures.

9. The method as claimed in claim 8, wherein
the liquid crystal device is a dot matrix liquid crystal device wherein
the liquid crystal material enclosed in the liquid crystal device is a ferroelectric liquid crystal material having a ferroelectric smectic phase, and
each of the two electrode structures of the flexible substrates is a striped electrode structure consisting of a plurality of electrode stripes arranged in parallel to each other, and
the two electrode structures are so arranged that the direction of the electrode stripes of one of the electrode structures and the direction of the electrode stripes of the other electrode structure approximately make right angle, thereby making in the ferroelectric liquid crystal material a plurality of separate picture element parts which are disposed between the electrode structures facing each other, and
a shearing force is applied to the ferroelectric liquid crystal material by bending the liquid crystal device, at a temperature lower than the temperature at which the ferroelectric liquid crystal exhibits isotropic phase or a mixed phase of isotropic phase and a liquid crystal phase, while an electric field is being applied to the ferroelectric liquid crystal material by applying a voltage between the electrode structures facing each other, thereby bringing about uniaxially homogeneous orientation into the separate picture element parts of the ferroelectric liquid crystal material.

10. The method as claimed in claim 8, wherein the liquid crystal material, which is enclosed in a liquid crystal device comprising two flexible substrates supporting the liquid crystal material between them and bearing on their surfaces facing each other their respective electrode structures, is a ferroelectric liquid crystal material having a ferroelectric smectic phase, and
a shearing force is applied to the ferroelectric liquid crystal material by bending the liquid crystal device using a roller consisting of at least one conductive orientation roll in such a manner that the liquid crystal device is brought into contact with the surface of the conductive orientation roll, at a temperature lower than the temperature at which the liquid crystal material exhibits isotropic phase or a mixed phase of isotropic phase and a liquid crystal phase, while an electric field is being applied to the ferroelectric liquid crystal material by applying a voltage to the conductive orientation roll, thereby bringing about uniaxially homogeneous orientation into the ferroelectric liquid crystal material.

11. The method as claimed in claim 10, wherein
the two flexible substrates bearing their respective electrode structures are so arranged that a part of at least one of the electrode structures borne by the flexible substrates is exposed and
a shearing force is applied to the ferroelectric liquid crystal material by bending the liquid crystal device in such a manner that the liquid crystal device is brought into contact with the surface of the at least one conductive orientation roll, with the exposed part of the electrode structure brought into contact with the surface of the conductive orientation roll, at a temperature lower than the temperature at which the ferroelectric liquid crystal material exhibits isotropic phase or a mixed phase of isotropic phase and a liquid crystal phase, while an electric field is being applied to the ferroelectric liquid crystal material by applying a voltage to the conductive orientation roll to apply a voltage between the two electrode structures facing each other, thereby bringing about uniaxially homogeneous orientation into the ferroelectric liquid crystal material.

12. The method as claimed in claim 10, wherein
the two flexible substrates bearing their respective electrode structures are so arranged that a part of each of the electrode structures borne by the flexible substrates is exposed,
the roller consists of two conductive orientation rolls, and
a shearing force is applied to the ferroelectric liquid crystal material by bending the liquid crystal device in such a manner that two sides of the liquid crystal device are brought into contact with the surfaces of the two conductive orientation rolls in turn, with the exposed parts of the electrode structures brought into contact with the surfaces of the conductive orientation rolls in turn, at a temperature lower than the temperature at which the ferroelectric liquid crystal material exhibits isotropic phase or a mixed phase of isotropic phase and a liquid crystal phase, while an electric field is being applied to the ferroelectric liquid crystal material by applying a voltage between the two conductive orientation rolls to apply a voltage between the two electrode structures facing each other, thereby bringing about uniaxially homogeneous orientation into the ferroelectric liquid crystal material.

13. The method as claimed in claim 10, wherein
the electrode structure of at least one of the flexible substrates bearing their respective electrode structures consists of a plurality of electrodes insulated from each other,
the flexible substrates bearing their respective electrode structures are so arranged that a part of each of the electrodes insulated from each other is exposed,
the conductive orientation roll has a plurality of conductive parts insulated from each other, and
a shearing force is applied to the ferroelectric liquid crystal material by bending the liquid crystal device in such a manner that the liquid crystal device is brought into contact with the surface of the conductive orientation roll, with the exposed parts of the electrodes brought into contact with the surfaces of the conductive parts of the conductive orientation roll respectively, at a temperature lower than the temperature at which the ferroelectric liquid crystal material exhibits isotropic phase or a mixed phase of isotropic phase and a liquid crystal phase, while an electric field is being applied to the ferroelectric liquid crystal materail by applying a voltage to each of the conductive parts of the conductive orientation roll to apply a voltage between the two electrode structure facing each other, thereby bringing about uniaxially homogeneous orientation into the ferroelectric liquid crystal material.

14. A dot matrix liquid crystal device oriented by the method as claimed in claim 9.

* * * * *